United States Patent [19]

Schroeder et al.

[11] Patent Number: 4,893,709
[45] Date of Patent: Jan. 16, 1990

[54] BACK-FLEXING ARTICLE CARRYING CHAIN

[75] Inventors: Roger H. Schroeder, Hartland; William G. Hodlewsky, Greendale, both of Wis.; James F. Murphy, Lynchburg, Va.

[73] Assignee: Rexnord Corporation, Milwaukee, Wis.

[21] Appl. No.: 234,335

[22] Filed: Aug. 18, 1988

[51] Int. Cl.$^4$ .............................................. B65G 17/06
[52] U.S. Cl. ..................................... 198/852; 198/853
[58] Field of Search ............... 198/831, 841, 852, 853, 198/851

[56] References Cited

U.S. PATENT DOCUMENTS

| 3,269,526 | 8/1966 | Imse et al. | 198/189 |
|---|---|---|---|
| 3,768,631 | 10/1973 | Wahren | 198/189 |
| 3,779,368 | 12/1973 | Smith | 198/204 |
| 3,804,232 | 4/1974 | Freiwald et al. | 198/195 |
| 4,436,200 | 3/1984 | Hodlewsky et al. | 198/851 |
| 4,524,865 | 6/1975 | von Hofen | 198/852 |
| 4,542,821 | 9/1985 | Livermore | 198/851 |
| 4,597,492 | 7/1986 | Lachonius et al. | 198/852 |

FOREIGN PATENT DOCUMENTS 934690 10/1973 Canada .................... 198/852
3235224 7/1987 Fed. Rep. of Germany .

OTHER PUBLICATIONS

Dyna-Veyor, pamphlet, cited by Applicants, Apr. 1975.

Primary Examiner—Joseph E. Valenza
Attorney, Agent, or Firm—Michael, Best & Friedrich

[57] ABSTRACT

An article carrying chain includes a plurality of interconnected molded plastic chain link assemblies each having a planar top plate. The chain link assemblies are interconnected so as to permit articulation between adjacent links around orthogonal axes. The potential for wear or breakage between adjacent links is reduced by beveling at least one of the mating edges between the top plates of adjacent links. Product kick-up is avoided by rounding the upper surface of each top plate along its leading and trailing edges. The underside of each link assembly is shaped so as to be engageable by either side of a sprocket tooth to thereby permit the sprocket to drive the chain in either of two directions. A plurality of upper and lower tabs formed along the lower portions of the chain link assemblies function to stabilize the chain relative to a pair of glide rails while permitting free removal of the chain link assemblies from the guide rails.

11 Claims, 2 Drawing Sheets

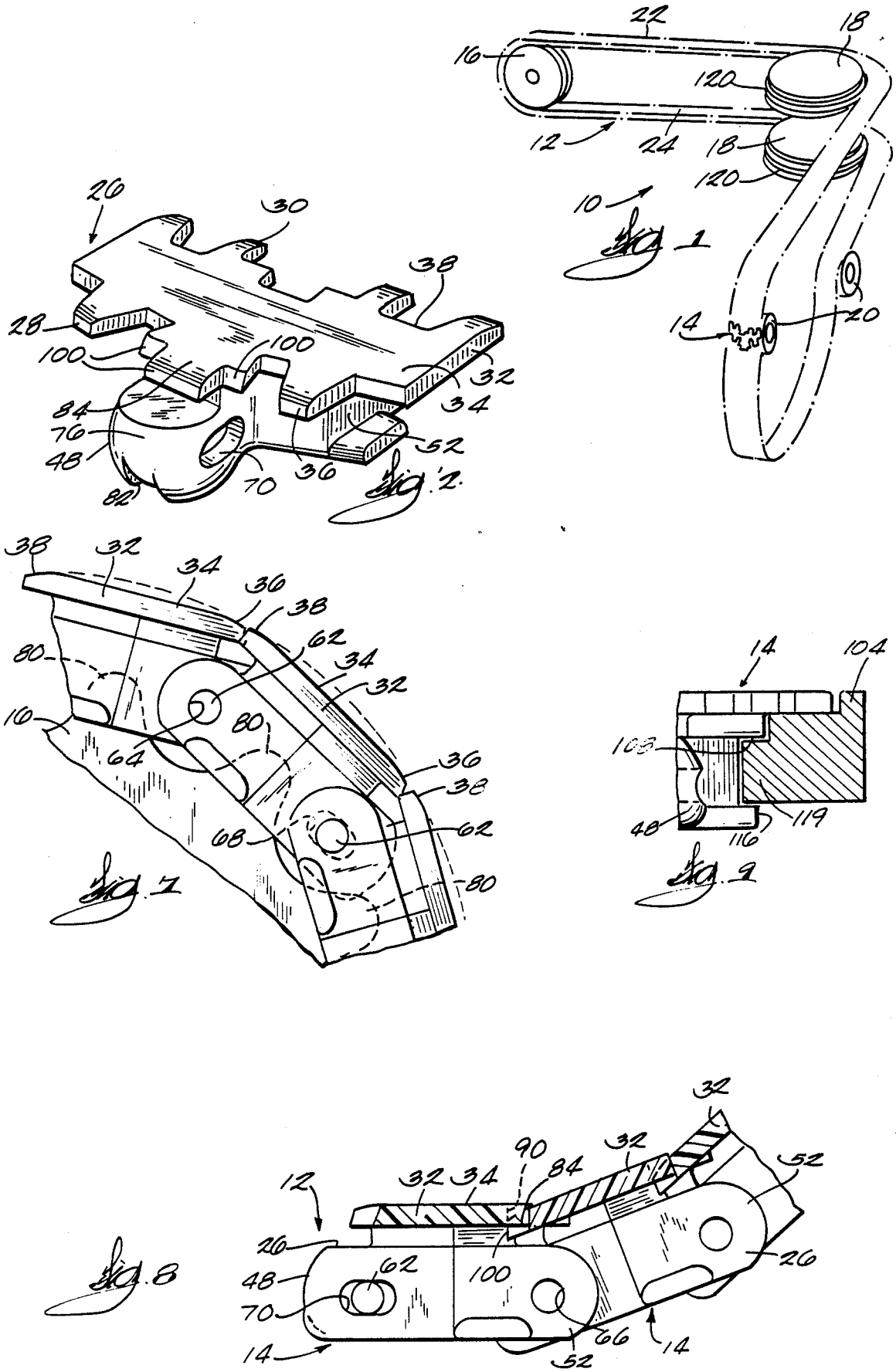

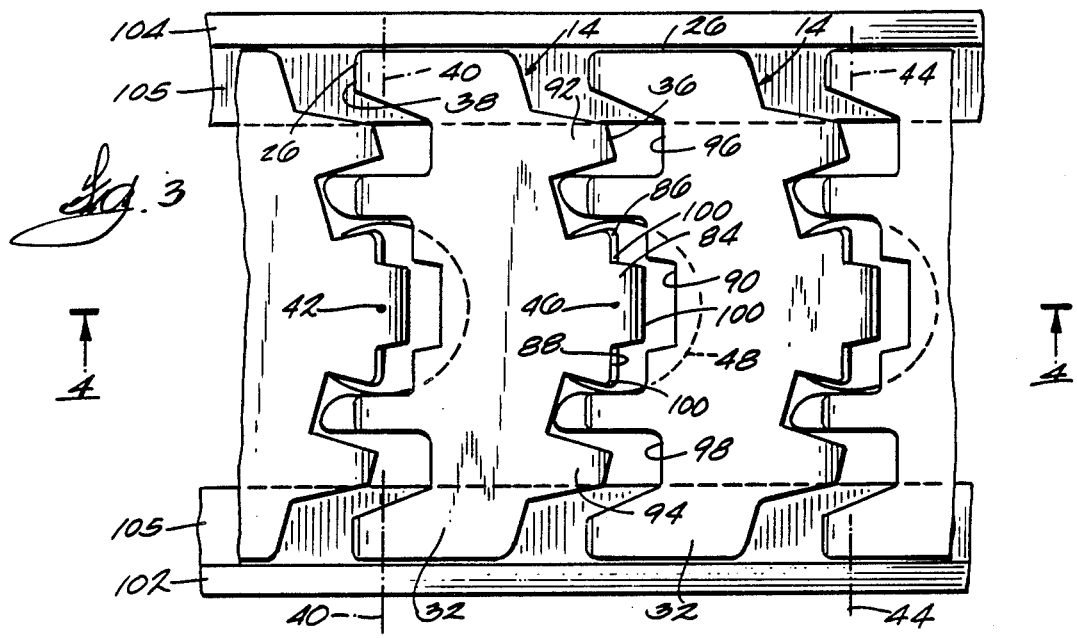
Fig. 3
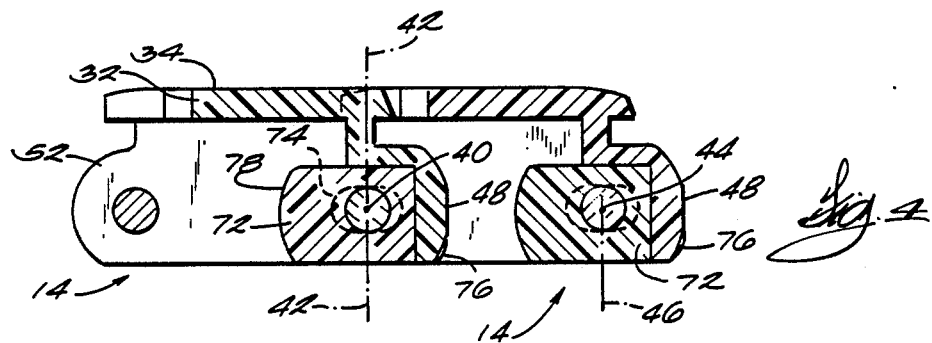
Fig. 4
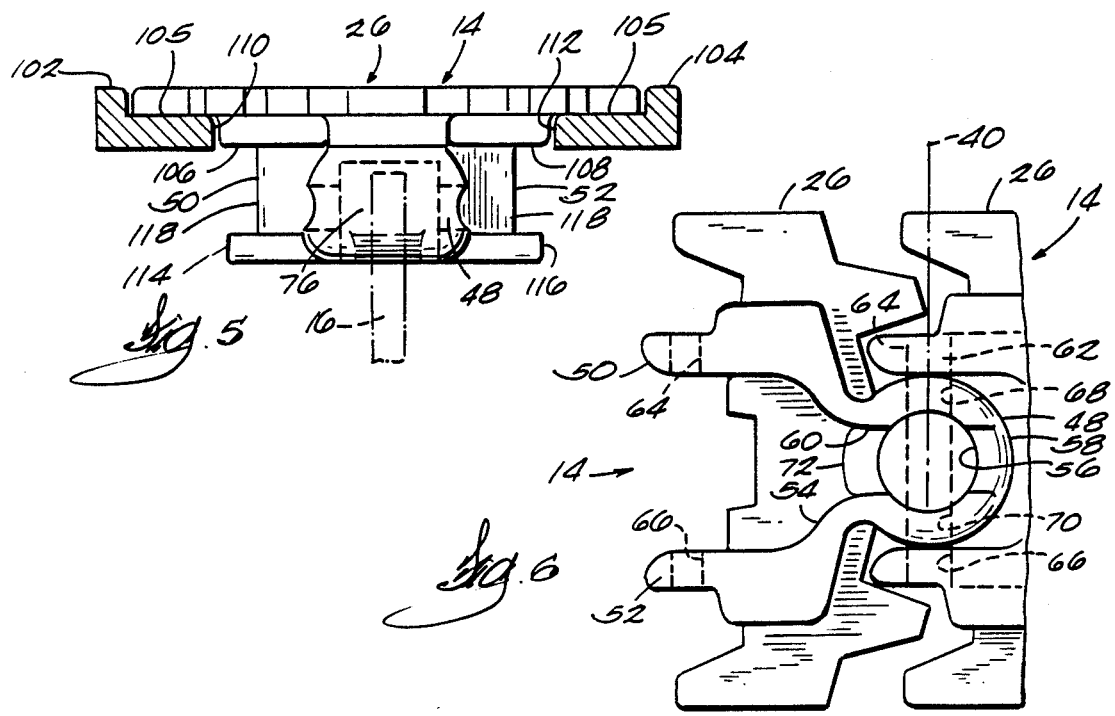
Fig. 5
Fig. 6

BACK-FLEXING ARTICLE CARRYING CHAIN

FIELD OF THE INVENTION

This invention relates generally to chains, and, more particularly, to flat-toP article carrying chains wherein the chain is made up of a plurality of molded plastic links.

BACKGROUND PRIOR ART

Flat-top article carrying chains formed of molded plastic links are known and are shown, for example, in U.S. Pat. Nos. 3,269,526, 3,768,631, 3,779,368, 3,804,232 and 4,436,200. Attention is also directed to German patent No. 32 35 224 C2.

SUMMARY OF THE INVENTION

It is a general object of the present invention to provide a new and improved article carrying chain formed of molded plastic links.

It is also an object of the present invention to provide a new and improved article carrying chain wherein the leading edge of the article carrying surfaces of the links are bevelled in such a manner as to engage the trailing edge of an adjacent chain link in face to face mating relation, to thereby minimize wear of the chain during back-flexing and to reduce the minimum back-flex radius of the resulting chain.

It is another object of the invention to provide a chain link having side thrust surfaces of increased area adapted to engage opposed surfaces of a conveyor frame supporting the chain such that the side thrust surface area of the chain is maximized to thereby maximize the permissable speed of operation of the chain.

It is also an object of the present invention to provide a new and improved article carrying chain wherein product kick-up is avoided as the chain flexes in the vertical plane.

It is another object of the present invention to provide a new and improved article carrying chain wherein the chain can be driven in either direction by a drive sprocket.

The invention provides a chain comprising a plurality of substantially identical links joined to one another in end-to-end relationship. Each of the links comprises a unitary member including a top plate, a forward knuckle portion integrally joined to the top plate, and a pair of spaced side bar portions extending rearwardly from the knuckle portion and below the top plate portion and dimensioned to receive, therebetween, the knuckle portion of the next following chain link. A connecting pin extends through the spaced side bars and the knuckle housed therebetween, to thereby connect a pair of links so as to permit limited pivotal movement between those adjacent links around a horizontal axis and around a vertical axis, the vertical axis extending substantially perpendicularly to the horizontal axis and intersecting the horizontal axis. Each of the top plates includes a forward edge and a rearward edge. At least one of the forward or rearward edges includes a bevelled portion located so as to move into face to face contact with the other of the forward or rearward edges of the top plate of the next adjacent chain link when the chain is back-flexed so that the adjacent chain links are rotated to a predetermined position around the horizontal axis.

The invention also provides a chain link adapted for use in an article carrying conveyor wherein a plurality of the chain links are joined in end-to-end relationship to form a closed loop, and wherein limited articulated movement between adjacent ones of the chain links around mutually orthogonal axes is permitted. The chain link includes a substantially planar top plate and structure, formed adjacent the underside of the top plate, for facilitating connection of the chain link to a following chain link so as to permit limited pivoting movement between the chain link and the following chain link around a first horizontal axis oriented parallel to the top plate and around a first vertical axis oriented perpendicularly to the top plate. The chain link further includes additional structure, formed adjacent the underside of the top plate, for facilitating connection of the chain link to a leading chain link so as to permit limited pivoting movement between the chain link and the leading chain link around a second horizontal axis oriented parallel to the top plate and around a second vertical axis oriented perpendicularly to the top plate. The top plate includes an arcuate rearward surface and an arcuate forward surface, each of the arcuate surfaces being shaped and positioned relative to the horizontal axes such that articles carried on the top plate are not displaced upwardly as the chain link pivots relative to the trailing and leading links around the first and second horizontal axes.

BRIEF DESCRIPTION OF THE DRAWINGS

The features of the present invention which are believed to be novel are set forth with particularity in the appended claims. The invention, together with the further objects and advantages thereof, may best be undrstood by reference to the following description, taken in conjunction with the accompanying drawings, in the several figures of which like reference numerals identify like elements, and in which:

FIG. 1 is a simplified diagrammatic view of a conveyor system incorporating an article carrying chain embodying various features of the invention.

FIG. 2 is a perspective view of a unitary chain link member embodying various features of the invention.

FIG. 3 is a top plan view of the article carrying chain incorporated in the conveyor illustrated in FIG. 1.

FIG. 4 is a cross-sectional view taken along line 4-4 in FIG. 3.

FIG. 5 is an end view of one link of the article carrying chain supported between a pair of guide rails.

FIG. 6 is a bottom plan view of the article carrying chain incorporated in the conveyor illustrated in FIG. 1.

FIG. 7 is a fragmentary side elevational view of the article carrying chain showing the chain passing over a driven sprocket.

FIG. 8 is a side elevational view of the article carrying chain shown in a maximum back-flex position.

FIG. 9 is a partial view similar to FIG. 5 and illustrating a chain link housed between guides members which prevent upward movement of the chain with respect to the guide members.

DESCRIPTION OF THE PREFERRED EMBODIMENT

Referring to the drawings, a conveyor 10 including an article carrying chain 12 embodying various features of the invention, is illustrated in FIG. 1. The chain 12 comprises a plurality of substantially identical chain link assemblies 14 joined to one another in end-to-end relationship so as to form a closed loop. The closed loop is reeved over a powered drive wheel or sprocket 16 and over a plurality of corner disks 18 and idlers 20 so as to form an upper run 22, on which articles can be carried, and a lower return run 24. It will be appreciated that, in order to increase flexibility in the configuration of the conveyor 10, it is desirable that the capability for limited pivotal movement, in both the horizontal and vertical planes, be provided between adjacent chain link assemblies 14 within the chain 12.

The construction of the chain link assemblies 14 can best be understood by reference to FIGS. 2 through 6. As shown, each chain link assembly 14 includes a unitary chain link member 26 formed of a molded thermoplastic material such as, for example, "Delrin," and includes a leading end 28 and a trailing end 30. Each of the unitary chain link members 26 includes a top plate 32 having a generally planar upper surface 34 and forward and rearward edges 36 and 38.

In order to provide the desired capability for chain articulation in both the horizontal and vertical planes, means are provided in each chain link assembly 14 for facilitating connection of each chain link member 26 to a trailing or following chain link member 26 so as to permit limited pivoting movement between the chain link member 26 and the following chain link member around a first horizontal axis 40 oriented substantially parallel to the top plate 32, and around a first vertical axis 42 oriented substantially perpendicularly to the top plate 32. Additional means are formed adjacent the underside of the top plate 32 for facilitating connection of a particular chain link member 26 to a leading or preceding chain link member 26 so as to permit limited pivoting movement between the chain link member and the preceding chain link member around a second horizontal axis 44 oriented parallel to the top plate, and around a second vertical axis 46 oriented perpendicularly to the top plate 32. In the illustrated embodiment, such means include a forward head or knuckle portion 48 formed along the underside of the top plate 32 adjacent the forward end of the chain link member 26 and further include a lower portion comprising a pair of spaced side bar portions 50, 52 extending rearwardly from the knuckle portion 48 below the top plate 32. The side bars 50, 52 are spaced from each other to form a socket 54 along the trailing end of the chain link member 26 into which the knuckle portion 48 of the following chain link member 26 can be received.

The knuckle portion 48 of each chain link member 26 is generally cylindrical in form and includes a generally cylindrical hollow interior 56 having a closed forward end 58 and an open rear end 60. Thus, when the knuckle portion 48 of one chain link member 26 is positioned between the side bars 50, 52 of a preceding chain link, limited pivoting movement between the chain links around the axes 42, 46 oriented substantially perpendicularly relative to the top plates 32 of the chain links 26 is possible. In addition, the upper surface of the knuckle portion 48 is flattened so that limited pivoting movement of the chain links, around the axes 40, 44 extending generally across the width of the chain 12, is possible.

The interlocking chain link members 26 are joined to one another by means of a connecting pin 62 extending through aligned apertures 64, 66 formed in the rearward portions of the side bars 50, 52, and through additional apertures 68, 70 formed in the knuckle portion 48 positioned therebetween. Preferably, the apertures 68, 70 formed in the knuckle portion 48 of each chain link member 26 are elongated so that the chain link member 26 can pivot in a horizontal plane around the connecting pin 62.

Each chain link assembly 14 further includes a molded plastic insert 72 which is dimensioned to fit closely within the hollow interior 56 of the knuckle portion 48 around the connecting pin 62. Each insert 72 also includes a transverse bore 74 of elongated cross section dimensioned as to permit limited pivoting movement of the chain link members 26 in a horizontal plane relative to one another.

As best seen in FIGS. 2 and 4, the forwardmost end 76 of each knuckle portion 48, and the rearwardmost surface 78 of each insert 72, are shaped so as to conform to the shape defined between adjacent teeth 80 of the drive sprocket 16. To this end, a notch or groove 82 is formed in the lower forward end 76 of the knuckle portion 48, and the rearward surface 78 of the insert 72, exposed between the forwardmost ends of the side bars 50, 52 at their juncture with the knuckle portion 48, is curved to the shape of the sprocket teeth 80. When so shaped, each chain link assembly 14 is capable of being driven in either direction by the drive sprocket 16. Thus, the chain 12, and therefore the conveyor 10, are capable of bi-directional operation.

Referring to FIG. 3, the top plate 32 of each chain link assembly 14 is substantially symmetrical about the center line of the chain 12, and the forward and rearward edges 36, 38 of the top plate 32 are provided with generally complementary projections and notches. In particular, the forward edge 36 of each top plate 32 includes a central projection 84 having a pair of side notches 86, 88 while the trailing edge 38 includes a central notch 90 corresponding generally to the shape of the central projection 84. The forward edge 36 of each top plate 32 further includes a pair of forwardly projecting, trapezoidally-shaped, spaced side projections 92, 94 on either side of the central projection 84, while the rearward edge 38 of each top plate 32 includes a pair of complementary notches 96, 98. The spacing between the top plates 32 of adjacent ones of the chain link members 26 when the links are interconnected by the connecting pins 62 is such that a definite clearance is maintained between adjacent top plates 32 when the chain 12 is substantially unflexed. When the chain 12 is flexed either right or left in the horizontal plane, clearance is maintained between the top plates 32 while the interfitting side projections 92, 94 and notches 96, 98 move closer to each other along the inside of the turn and away from each other along the outside of the turn.

In the illustrated embodiment, a bevel 100 is provided on the forwardmost edges of the central top plate projection 84 and the two side notches 86, 88 such that, when the chain 12 is flexed to the maximum position shown in FIG. 8, the bevelled face 100 of the central projection 84 of a trailing link engages the rear face of central notch 90 of a preceding link in face to face relation. In a preferred form of the invention the bevelled face defines an angle of 10° with respect to the vertical. Although the bevel 100 is shown as being on the central projection, it will be appreciated that the bevel could, alternatively, be formed in the central notch 90. As best seen in FIG. 8, if the chain, when the chain is "backflexed" (i.e. curved around a center of curvature located above the carrying surface of the chain 12), the central projections 84 of the chain links are driven into contact with the central notches 90 of the preceding chain links. Because of the bevel 100, such contact is face to face and line contact between adjacent links is avoided. This helps reduce wear and avoids damage to or breakage of the adjacent chain link members 26 resulting from such line contact.

In order to prevent undesired product kick-up as the chain 12 proceeds to pass over the sprocket 16 as illustrated in FIG. 7, the upper surface 34 of the top plate 32 of each chain link member 26 is downwardly curved along both the forward and rearward edges 36, 38 of the top plate 32. As illustrated, the upper surface 34 of the top plate 32 along the rearward edge 38 is curved to a radius centered on the axis defined between the apertures 64, 66 formed in the side bars 50, 52 while the upper surface 34 of the top plate 32 along the forward edge 36 is curved to a radius centered on the axis through the apertures 68, 70 formed through the knuckle portion 48 of the chain link member 26. When so shaped, the forward and rearward edges 36, 38 of each chain link member 26 do not project above the conveying surface of the chain 12 as the chain 12 passes over a sprocket 16 as illustrated in FIG. 7. Undesired product kick-up is thus avoided.

Referring to FIG. 5, the article conveying chain 12 is adapted to be supported between a pair of opposed, spaced guide rails 102, 104 each including an inner ledge 105. The top plate 32 is dimensioned to rest on the ledges 105 between the opposed guide rails 102, 104, and a pair of upper tabs 106, 108 integrally formed on the outer sides of each of the side bars 50, 52 fit between the inner opposed edges 110, 112 of the guide rail ledges 105. The upper tabs 106, 108 function to limit sideways movement of the chain 12 by riding along the inner opposed edges 110, 112 of the guide rail ledges 105.

Each chain link member 26 further includes a pair of lower tabs 114, 116 projecting from lower portions of the side bars 50, 52 and spaced below the upper tabs 106, 108 so that a generally rectangularly sectioned groove 118 is formed along each side of the chain link member 26 in the outer side faces of the lower portion. The groove 118 thus formed is dimensioned and positioned so as to receive an outwardly projecting, circumferentially extending, retaining ridge 120 (FIG. 1) formed on the outer periphery of each of the corner disks 18. Thus, when a chain link assembly 14 passes around the corner disk 18, the circumferential ridge 120 extends into the groove 118 formed between the upper and lower tabs of the chain link member 26 and thereby locks the chain link assemblies 14 against vertical movement relative to the corner disk 18. This helps prevent the chain 12 from rising as it travels around the corner disk 18. In other areas of the conveyor, for example, where the conveyor may curve upwardly, the conveyor rails can be provided with retaining projections 119 (FIG. 9) extending inwardly into the grooves 118 and such that engagement of the lower tabs 114 and 116 with retaining projections 119 will prevent upward movement of the chain links out of the conveyor. As best seen in FIG. 5, the distance across the lower tabs 114, 116 of each chain link member 26 is less than the distance between the opposed inner edges 110, 112 of the guide rails 102, 104 so that when the chain links are supported by guide rails having a configuration as in FIG. 5, each chain link member 26 can be lifted upwardly from the guide rails 102, 104 without interference. This avoids the need to thread the chain links over the ends of the guide rails during installation or removal of the chain.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

We claim:

1. A chain link for a chain including a plurality of said links joined to one another in end to end relationship, said link comprising a unitary member including a top plate, a forward knuckle portoin formed below said top plate, and a pairof spaced side bar portoins extending rearwardly from said knuckle portion below siad top plate and dimensioned to receive therebetween theknuckle portion of the next following chain link, said chain link being adapted to be included in a chain including a plurality of connecting pins exending through said spaced side bars and said knuckles received therebetween to join adjacent ones of said links and to permit limited pivotal movement between adjacent ones of said links around a substantially horizontal axis extending substantially between adjacent ones of said links and around a substantially vertical axis. oriented substantially perpendicularly to said horizontal axis, said top plate having a forwrd edge, a rearward edge, and a generally planar upper surface, at least one of said forward and rearward edges including a portion which is beveled from the upper surface downwardly towrd the adjacent link, the other of said forward and rearward edges including a portion which lies in a plane perpendicular to the plane defined by said upper surface of said top plate and which is located so as to move into substantially face to face mating contact with the beveled edgeof the top plate of the next adjacent chain link when adjacent chain links are rotated to a predetermined position around said horizontal axis.

2. A chain link as set forth in claim 1 wherein the chain is adapted to be driven by means of a sprocket adapted to engage said link, and wherein said forward knuckle portion of said link is hollow and includes an open rear end, and wherein said link further includes an insert adapted to be received within said hollow forward kuckle portion so as to close said open rear end of said hollow knuckle portion, said forward end of said hollow knuckle portion and said insert each being shaped so as to conform to the shape of the sprocket and thereby permit the sprocket to drive the chain in either direction through engagement of the sprocket with either of said hollow knuckle portion or said insert.

3. A chain link as set forth in claim 1 wherein said forward edge includes a central projection and said rearward edge includes a central notch shaped and dimensioned to receive said central projection.

4. A chain link as set forth in claim 3 wherein said beveled portion is located on said central projection.

5. A chain link in accordance with claim 4 wherein said forward edge further includes a pair of side notches on opposite sides of said central projection, each of said side notches including a beveled face.

6. A chain link adapted for use in an article carrying conveyor wherein a plurality of said chain links are joined in end to end relationship to form a closed loop and wherein limited articulated movement between adjcent ones of said chain links around mutually orthogonal axes is permitted, said chain link comprising:

a substantially planar top plate having a forward edge including a central projection, and side projection on either side of the central projection and spaced from the central projection, said top late further having a rearward edge including projections and notches which are generally complementary to the projections and notches in the forward edge;

means formed adjacent the underside of said top plate for facilitating connection of said chain link to a following chain link so as to permit pivoting movement between said chain link and the following chain link around a first horizontal axis oriented substantially parallel to said top plate and around a first vertical axis oriented substantially perpendicularly to said to plate; and additional means formed adjacent the underside of said top plate for facilitating connection of said chain link to a leading chain link so as to permit limited pivoting movement between said chain link and the leading chain link around a second horizontal axis oriented substantially parallel to said top plate and around a second vertical axis oriented substantially perpendicularly to said top plate;

said top plate including an arcuate rearward surface proximate the rearwrd edge and having a center of curvature proximate the first horizontal axis, and an arcuate forward surface proximate the forward edge and having a center of curvature proximate the second horizontal axis.

7. A chain link in accordance with claim 6 wherein said means formred adjacent the underside of sid top plate comprises a pair of spaced side bars and said additional means formed adjacent the underside of said top plate comprises a forward knuckle portion adapted to be received between said spaced side bars of a leading chain link.

8. A chain link in accordance with claim 6 wherein said chain link further comprises means for engaging a driven sprocket so as to drive said chain link in either of two opposite directions.

9. A chain link for a chain including a plurality of said links joined to one another in end-to-end relationship, said link comprising a unitary member including a top plate, a forward knuckle portion formed below said top plate, and a pair of spaced side bar portions extending rearwardly from said knuckle portion below siad top plate and dimensioned to receive therebetween the knuckle portion of the next following chain link, said chain link being adapted to be included in a chain including a plurality of connecting pins extending through said spaced side bars and said knuckles received therebetween to join adjacent ones of said links and to permit limited pivotal movement between adjacent ones of said links around a substantially horizontal axis extending substantially between adjcent ones of said links and around a substantially vertical axis oriented substantially perpendicularlyto said horizontal axis, said top plate having a forwrad edge including a central projection, and a side projection on either side of the central projection and spaced from the central projection, said top plate further having a rearward edge including projections and notches which are generally complementary to the projections and notches in the forward edge, said top plate further having a generally planar upper surface, at least one of said forwrd and rearward edges including a portion which is beveled from the upper surface downwardly toward the adjacent link, the other of said forward and rearward edges including a portion which lies in a plane perpendicular to the plane defined by said upper surface of said top plate and which is located so as to move into substantially face-to-face mating contact with the beveled edge of the top plate of the next adjacent chainlink when adjacent chain links are rotated to a predetermined positoin around siad horizontal axis, said upper surface of said top plate being arcuately shaped at said forward edge with a center of curvature proximate the axis defined by the connecting pin through said knuckle, and said upper surface of said top plate being arcuately shaped at said rearward edge with a center of curvature proximate the axis defined by the connecting pin through said spaced side bars.

10. A chain link in accordance with claim 9 and further comprising means for engaging a driven sprocket so as to drive said chain in either of two opposite directions.

11. A chain comprising a plurality of substantially identical links joined to one another in end to end relationship, each of said links comprising a unitary member including a top plate, a forward knuckel portion formed below said top plate, and a pair of spaced side bar portions extending rearwardly from said knuckle portion below said top plate and dimensioned to receive therebetween the knuckle portion of the next following chain link, said chain further including a plurality of connecting pins extending through said spaced side bars and said knuckles received therebetween to join adjacent ones of said links and to permit limited pivotal movement between adjacent ones of said links around a substantially horizontal axis extending substantially between adjacent ones of saidlinks and around a substantially vertical axis oriented substantially perpendicularly to said horizontal axis, each of said top plate having a forward edge and a rearward edge, at least one of said forward or rearward edges including a beveled portion located so as to move into substantially face to face mating contact with the other of said forward or rearward edges of the top plate of the next adjacent chain link when said adjacent chain links are rotated to a predetermined position around said horizontal axis, wherein said chain is adapted to be driven by means of a sprocket adapted to engage individual ones of the links, and wherein each of said forward knuckle portions of each of said links is hollow and includes an open rear end, and wherein each of said links further includes an insert adapted to be received within said hollow forwards knuckle portion so as to close said open rear end of said hollow knuckle portion, said forward end of said hollow knuckle portion and said insert each being shaped so as to conform to the shape of the sprocket and thereby permit the sprocket to drive the chain link assembly in either direction through engagement of the sprocket with either of said hollow knuckle portion or said insert.

* * * * *

UNITED STATES PATENT AND TRADEMARK OFFICE
CERTIFICATE OF CORRECTION

PATENT NO. : 4,893,709

DATED : January 16, 1990

INVENTOR(S) : Roger H. Schroeder et al.

It is certified that error appears in the above-identified patent and that said Letters Patent is hereby corrected as shown below:

IN THE CLAIMS

Claim 1, Column 6, line 11, "pairof" should read --pair of--;
line 12, "siad" should read --said--;
lines 13-14 "thek-nuckle" should read --the knuckle--;
line 16, "exending" should read --extending--;
line 27, "towrd" should read --toward--;
line 33, "edgeof" should read --edge of--.

Claim 6, Column 6, line 66 "and side" should read --and a side--;
line 68 "late" should read --plate--.

Claim 7, Column 7, line 27, "sid" should read --said--.

Claim 9, Column 7, line 42, "siad" should read --said--;
line 53, "perpendicularlyto should read --perpendicularly to--;
line 54, "forwrad" should read --forward--;
line 61, "forwrd" should read --forward--;
Column 8, line 8, "chainlink" should read --chain link--;
line 10, "siad" should read --said--.

UNITED STATES PATENT AND TRADEMARK OFFICE
CERTIFICATE OF CORRECTION

PATENT NO. : 4,893,709

DATED : January 16, 1990

INVENTOR(S) : Roger H. Schroeder, et al

It is certified that error appears in the above-identified patent and that said Letters Patent is hereby corrected as shown below:

Claim 11, Column 8, line 26, "knuckel" should read --knuckle--;
line 37, "saidlinks" should read --said links--;
line 39, "plate" should read --plates--;
line 53, "forwards" should read --forward--.

Signed and Sealed this

Second Day of July, 1991

*Attest:*

HARRY F. MANBECK, JR.

*Attesting Officer*

*Commissioner of Patents and Trademarks*